United States Patent [19]

Palmer

[11] 4,447,077
[45] May 8, 1984

[54] FITTING FOR SMOOTH WALL TUBES

[75] Inventor: John H. Palmer, Coloma, Mich.

[73] Assignee: Ramer Test Tools, Inc., Riverside, Mich.

[21] Appl. No.: 282,434

[22] Filed: Jul. 13, 1981

[51] Int. Cl.³ .......................................... F16L 33/16
[52] U.S. Cl. .................................. 285/104; 285/323; 285/338
[58] Field of Search ................ 285/102, 323, 104, 338

[56] References Cited

U.S. PATENT DOCUMENTS

| | | | |
|---|---|---|---|
| 3,738,688 | 6/1973 | Racine | 285/323 X |
| 3,779,587 | 12/1973 | Racine | 285/323 X |
| 3,868,132 | 2/1975 | Racine | 285/323 X |
| 4,154,465 | 5/1979 | Van Meter | 285/323 X |
| 4,225,159 | 9/1980 | Van Meter | 285/104 |
| 4,326,407 | 4/1982 | Van Meter | 285/102 X |

Primary Examiner—Dave W. Arola
Attorney, Agent, or Firm—Robert E. Knechtel

[57] ABSTRACT

A fitting for mounting to the ends of smooth wall tubes, the fitting having an entry for the tube and a collet which grips on the outside diameter of the tube by means of a mechanical spring. The fitting also seals on the inside diameter of the tube. A passageway extends through the fitting such that the tube is in fluid communication with a supply source, the fluid being able to flow between the supply source and the tube. The fluid pressure activates a piston in the fitting which causes the collet to engage the tube more securely and also increases the seal within the inside diameter of the tube.

9 Claims, 2 Drawing Figures

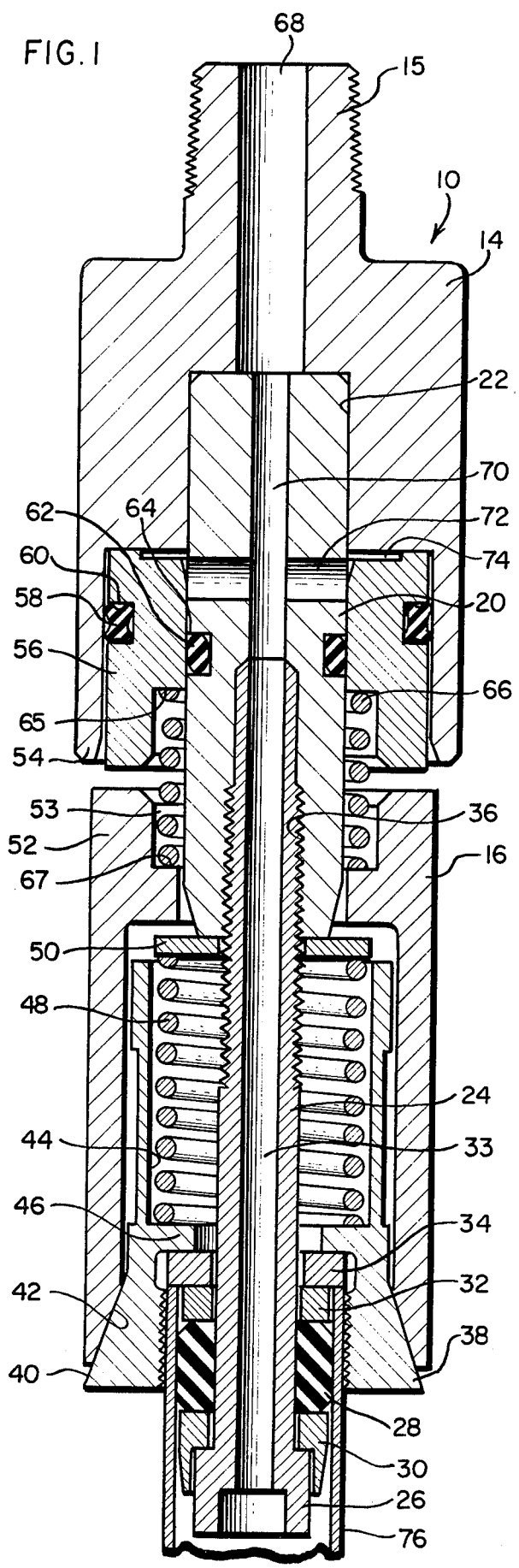
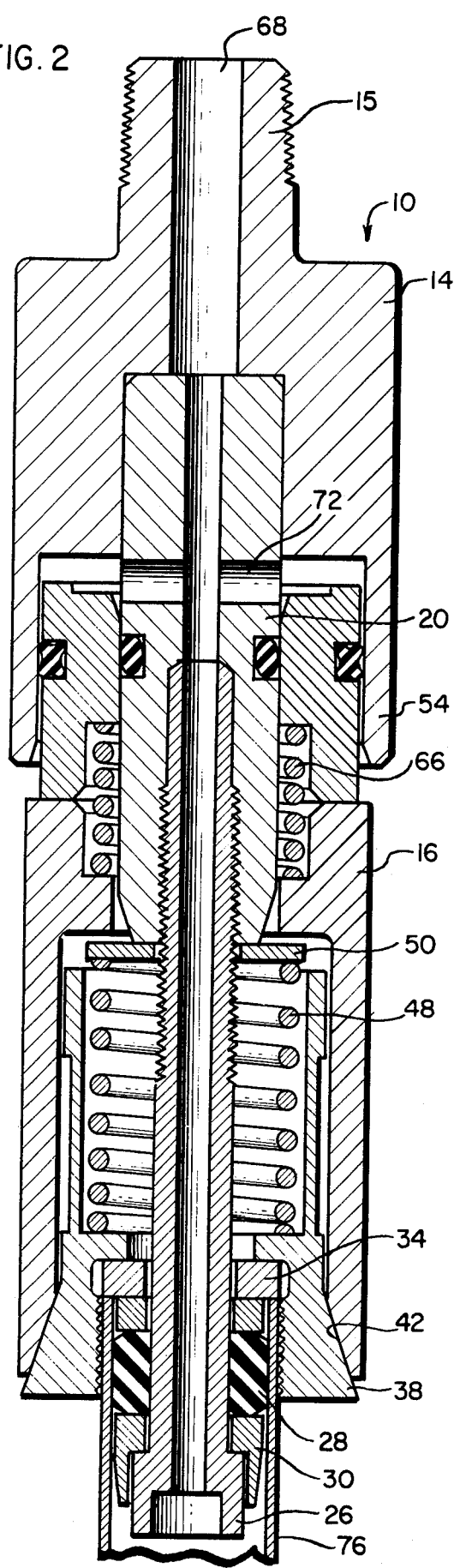

FITTING FOR SMOOTH WALL TUBES

BACKGROUND AND SUMMARY OF THE PRESENT INVENTION

The fitting of the present invention is generally related to those types of fittings disclosed in U.S. Pat. Nos. 3,738,688; 3,779,587; 3,868,132; 4,154,465; and 4,225,159.

The fittings disclosed in the above-mentioned U.S. patents are generally of two types. The first type grasps the tube by means of a collet around the outside of the smooth wall tube and compresses a tubular plug against the outer diameter of the tube upon translation of a ram element within the housing thereof. This type of fitting provides a good seal and holding action so that fluids passing through the smooth wall tube may be sealed by the fitting, or may be conveyed out of the fitting into auxiliary tubing mounted thereto. The second type of fitting is mounted to the ends of the tube by compressing a plug against the inner diameter of the tube upon translation of a ram element while a collet grasps a outer diameter of the tube. These types of fittings are especially useful on thin walled tubing wherein the gripping force of the collet is counter-balanced by the sealing of the plug. Both types of fittings utilize a manually operated torque transmitting lever to translate a ram element which seals and holds the smooth wall tube.

The present invention provides a fitting that grips on the outside diameter and also seals on the inside diameter. The gripping on the outside diameter is accomplished by the operation of a piston forced into operation by a fluid, the piston forcing a collet operator to cause a split collet to grasp the outside diameter of the tube. The fluid is under pressure and flows through the fitting to the smooth wall tube which is connected to the device to be tested. A fluid pressure further causes the seal on the inside diameter of the tube to compress around an elongated seal screw having a passage which allows the fluid to flow through the fitting. Initial gripping and sealing of the tube into the fitting is accomplished by a mechanical spring.

A fitting is applicable for use on a wide range of tube sizes, but has generally been found most applicable to tube ends with a minimum inside diameter of 0.295 inches. The fitting's configuration is designed for use on condensor and evaporator cores or other high pressure cores which periodically should be tested.

Accordingly, it is an object of the present invention to provide improved fittings for mounting to the ends of smooth wall tubes.

More particularly, it is an object to provide such a fitting which is semi-automatic and does not require manual operation of a lever or other handle-type torque transmitting device to accomplish the installation of the fitting.

It is an additional object to provide a fitting which is operable by fluid means while having the initial gripping and sealing accomplished by spring-loaded mechanical pressure.

BRIEF DESCRIPTION OF THE DRAWINGS

For a fuller understanding of the nature and objects of the invention, reference should be had to the following detailed description taken in connection with the accompanying drawings, in which:

FIG. 1 is a sectional view taken longitudinally through the fitting while in its inoperative position; and FIG. 2 is a sectional view of the fitting of FIG. 1 in its operated position.

DESCRIPTION OF THE PREFERRED EMBODIMENT

Referring now to FIG. 1, a tube fitting 10 is illustrated which comprises a body 14 with a threaded upper end 15. At the other or lower end of the body 14 is a collet operator 16 which is secured to the fitting 10, as will be more fully described below. A shaft 20 extends longitudinally through the body 14 and into the collet operator 16. The upper end of the shaft 20 is firmly secured into an axial bore 22 within the body 14. Securing can be done by means of press fitting or other similar methods.

An elongated seal screw 24 having an enlarged head 26 has a resilient sealing member 28 disposed about it, and the sealing member 28 is retained between a pair of seal stops 30 and 32 which are likewise disposed on the elongated seal screw, with one of the seal stops engageable with the enlarged head 26. there is a passage 33 provided through the seal screw 24, and its purpose will be described more fully below.

A tube stop 34 also is disposed about the seal screw 24, atop the seal stop 32. It may be noted that the seal stops 30 and 32, and the tube stop 34 are all of washer-type construction, with the diameter of the tube stop 34 being slightly larger than the diameter of the seal stops 30 and 32. The resilient sealing member 28 may be made of rubber or other like material, and is generally of a cylindrical configuration. The end of the seal screw 24 opposite the enlarged head 26 is threadedly secured to the shaft 20 by threadedly engaging its end within a threaded cavity 36 in the end of the shaft 20.

A split collet 38 is slidably engaged within the opened lower end of the collet operator 16. The collet operator 16 and the split collet 38 have complimentary conical-shaped cam surfaces 40 and 42 on them, respectively, for operating the collet 40 to grip the tube end, as will be more fully described below. The collet 40 also has an annular flange formed on its interior wall 44 which forms an annular shoulder or stop 46. A helical spring 48 is disposed about the seal screw 24 and disposed within the collet 38 and the collet operator 16. One end of the spring 48 bears against a shaft stop plate 50 which is in the upper interior portion of the collet 38. The other end of the spring 48 bears against the annular stop 46 on the collet 38. The spring 48 normally urges the collet 38 out of the collet operator 16, but the collet 38 is restrained therein by the annular stop 46 which engages against the tube stop 34.

The collet operator 16 has at its upper end a reduced portion 52 which forms an internal bore 53 surrounding the lower portion of the shaft 20.

The body 14 has a flange area 54 at its lower end. The flange area 54 receives a cylindrical piston 56 disposed about the shaft 20. Between the flange area 54 and the piston 56 is a sealing ring 58 within ring seal seat 60. Similarly, between the piston 56 and the shaft 20 is an O ring 62 in a ring seal seat 64. Within piston 56 is a top spring stop 65 encompassing shaft 20. A helical piston spring 66 is positioned against the stop 65 with the lowermost portion of the spring 66 resting in a bottom spring stop 67 located in the top portion of the collet operator 16. When the fitting 10 is to be used, the shaft 20 and the elongated seal screw 24 are screwed together. As the seal screw 24 moves into the threaded cavity 36, the spring 66 is placed in compression. This places an initial force against the collet operator 16 which forces the collet 38 to grasp the outer wall of a tube 76.

The fitting 10 has a fluid inlet channel or passage 68 to allow the introduction of a fluid generally under pressure. The shaft 20 has a shaft fluid channel 70 in fluid communication with the fluid inlet channel 68. Within the shaft 20 and generally perpendicular to the shaft fluid channel 70 is a shaft fluid chamber 72 to receive the fluid therefrom. At the top of the piston 56 is a piston chamber 74 also in fluid communication with the shaft fluid chamber 72.

In using the fitting 10, the initial pressure exerted on the split collet 38 is relieved by gripping the collet operator 16 by hand and pulling it upward (as illustrated). This releases the initial pressure that the collet operator 16 applied to the split collet 38, and the latter opens sufficiently to permit the end of a smooth wall tube 76 to be fitted into the split collet 38, about the end of the seal screw 24, with the seal stops 30 and 32 and the seal 28 disposed within the tube 76. The end of the tube 76 is urged onto or about the end of the seal screw 24, until the end of the tube 76 engages and is stopped by the tube stop 34. The minimum inside diameter of the tube 76 should be about 0.295 inches.

The collet operator 16 then is released, and the helical spring 66 forces the collet operator 16 in a downward direction such that the conical-shaped cam surfaces 40, 42 engage and force the split collet 38 to grasp the end of the tube 76. Simultaneously, the sealing member 28 is slightly compressed between seal stops 30 and 32 and into sealing engagement with the tube 76.

The threaded upper end 15 of the body 14 is connected to a high-pressure fluid supply source or from the component being tested. The high-pressure fluid passes through the fluid inlet channel 68, through the shaft fluid channel 70, into the shaft fluid chamber 72 and then to the piston chamber 74. This fluid pressure exerted on the top of the piston 56 forces it downward into engagement with the collet operator 16 and the latter is thereby forced downwardly against the split collet 38. This forces the split collet 38 to more securely grip or clamp the tube 76. As the pressure increases, the collet operator further closes the collet and simultaneously increases the sealing of the resilient sealing member 28 within the tube.

It will thus be seen that the objects set forth above, among those made apparent from the preceding description, are officially attained, and certain changes may be made in carrying out the above construction. Accordingly, it is intended that all matter contained in the above description or shown in the accompanying drawings, shall be interpreted as illustrative and not in a limiting sense.

What is claimed is:

1. A fitting for mounting to the ends of smooth wall tubes, said fitting being adapted to seal the inside diameter of the tube, and to grip the outside diameter of the tube in the same area so that the counter forces are such as to eliminate tube distortion, said fitting comprising:
   a body having an axial bore;
   a shaft disposed within said axial bore and having a shaft fluid channel extending axially through it;
   a passageway extending through said body and in fluid communication with said shaft fluid channel, whereby fluid from external means coupled to said fitting flows through said passageway into said shaft fluid channel;
   piston means slidably disposed about said shaft and within said body said body, piston means and shaft defining a piston chamber therebetween and fluid seals between said body and said piston means and between said piston means and said shaft sealing said chamber;
   a fluid channel in said shaft in fluid communication with said shaft fluid channel and said piston chamber;
   a collet operator slidably disposed about said shaft and positioned below said piston means to be operatively engagable by said piston means;
   spring means disposed between said piston means and said collet operator for normally maintaining a initial separation therebetween;
   an elongated screw having one end thereof coupled to said shaft, the other end of said elongated screw being adapted to extend into the end of a smooth wall tube and having stop means thereon and sealing means disposed between said stop means,
   a split collet slidably disposed within said collet operator and retained therein by said stop means on said elongated screw, said spit collet being adapted to receive therein the end of a smooth wall tube, said split collet and said collet operator having complimentary cam surfaces which are operatively engaged to operate said split collet upon operation of said collet operator to grip the outside diameter of said smooth wall tube,
   said stop means being slidably fixed on said elongated screw and being urged together by said split collet to compress said sealing means to seal the inside diameter of the smooth wall tube when said split collet is operated by said collet operator,
   said collet operator being operated by said piston means when fluid from the external means flows through said passageway into said shaft fluid channel and said piston fluid channel into said piston chamber.

2. The fitting of claim 1, wherein said spring means applies an initial force to said collet operator before said fluid is introduced whereby said split collet grips and holds the outside diameter of the tube without the assistance of said fluid operating said piston means.

3. The fitting of claim 1, further comprising second spring means disposed within said collet operator and applying an initial force to said split collet operator whereby said sealing means is compressed into sealing engagement with the inside diameter of the tube without the assistance of said fluid operating said piston.

4. The fitting of claim 3 wherein said fluid operates said piston means to further compress said sealing means into greater sealing engagement than provided by said second spring means acting independently.

5. The fitting of claim 3 and further comprising adjusting means to control said initial force of said second spring means to said split collet to control the compression and sealing means with said tube.

6. The fitting of claim 5 wherein said adjusting means comprises a threaded portion on said elongated screw and a threaded cavity within said shaft to receive said threaded portion.

7. The fitting of claim 1, wherein said sealing means comprises a substantially cylindrical-shaped resilient member disposed about said elongated screw, said resilient member being sandwiched between a pair of washer-like seal stops compressing said resilient member into sealing engagement with the inside of said tube when a force is applied to said split collet.

8. The fitting of claim 1 further comprising a tube stop, said tube stop comprising a washer-like tube stop disposed about said elongated screw, said washer-like tube stop being engageable by the terminal end of a tube to limit its insertion within said fitting.

9. The fitting of claim 1 wherein said body is provided with an externally threaded portion for coupling external means to said fitting to provide fluid to said fitting.

* * * * *